(No Model.)
J. E. KORDICK.
WATERING TROUGH.
No. 513,513. Patented Jan. 30, 1894.
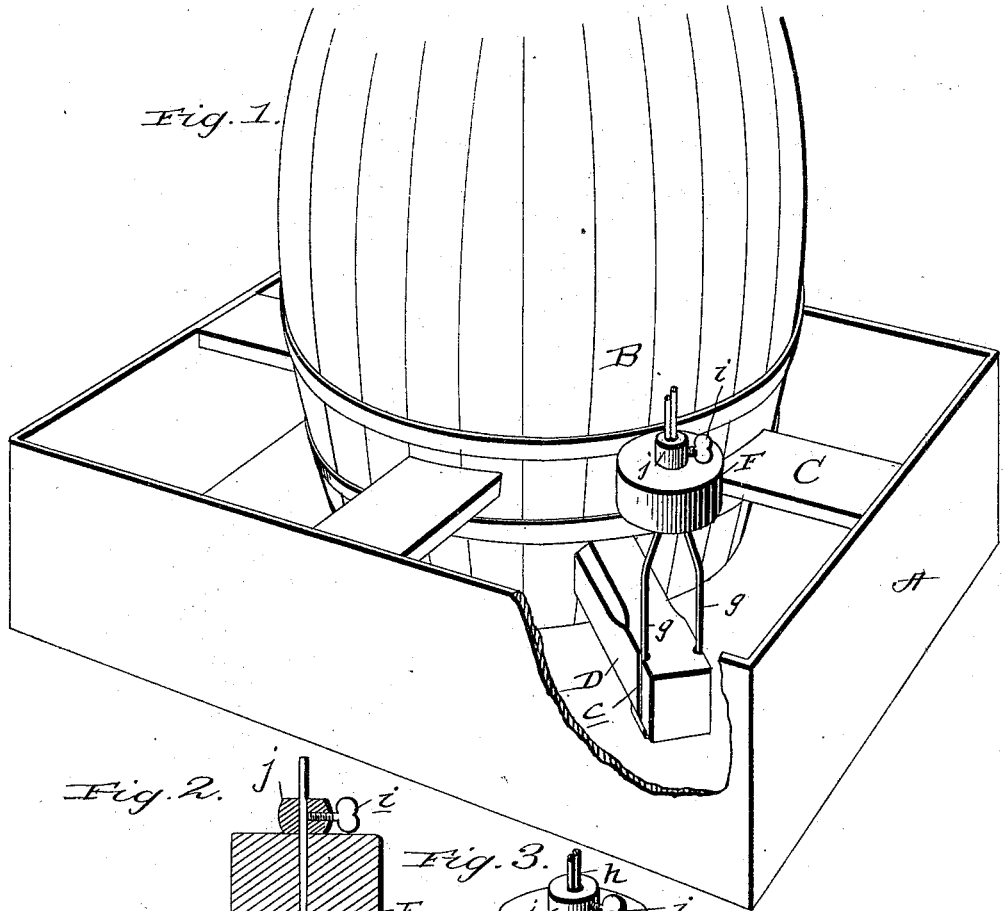
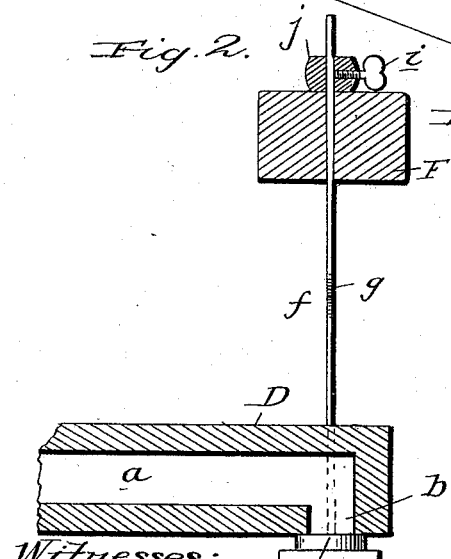
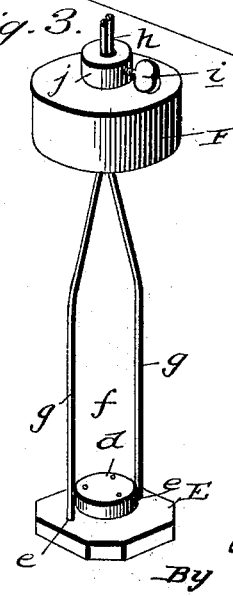
Witnesses:
C. H. Raeder
K. F. Matthews
Inventor
J. E. Kordick
By James J. Sheehy
Attorney

UNITED STATES PATENT OFFICE.

JOHN EDWARD KORDICK, OF BRIDGEWATER, IOWA.

WATERING-TROUGH.

SPECIFICATION forming part of Letters Patent No. 513,513, dated January 30, 1894.

Application filed September 8, 1893. Serial No. 485,209. (No model.)

*To all whom it may concern:*

Be it known that I, JOHN EDWARD KORDICK, a citizen of the United States, residing at Bridgewater, in the county of Adair and State of Iowa, have invented certain new and useful Improvements in Apparatus for Watering Stock; and I do declare the following to be a full, clear, and exact description of the invention, such as will enable others skilled in the art to which it appertains to make and use the same.

My invention relates to improvements in apparatus for watering stock; and its novelty will be fully understood from the following description and claims when taken in connection with the annexed drawings, in which—

Figure 1, is a perspective view of my improved apparatus with a portion of the tank broken away to show the spout and the valve for controlling the supply of water. Fig. 2, is a detail sectional view of the spout and the valve, and Fig. 3, is a perspective view of the valve removed from the spout.

In the said drawings, similar letters designate corresponding parts in all of the views, referring to which—

A, indicates the tank of my improved apparatus. This tank is preferably of a rectangular form and of about the proportional depth illustrated, and in its center is arranged the reservoir barrel or cask B, which may be supplied with water in any approved manner. The barrel or cask B, rests upon the bottom of the tank A, and is secured by the horizontal bars C, which are connected to the side walls of the tank and to the barrel or cask, as shown; and said barrel or cask is of such a size that a sufficiently large space will be formed between it and the side walls of the tank for the animals to drink.

D, indicates the spout which communicates with and extends radially from the barrel or cask adjacent to the bottom thereof, as shown. This spout D, is provided with a longitudinal bore *a*, which extends from its inner end to a point adjacent to its outer end and terminates in an aperture *b*, formed in the bottom of the spout; and said spout is also provided in the outer sides of its side walls at points opposite the aperture *b*, with vertical ways or grooves as *c*, the purpose of which, will be presently disclosed.

E, indicates the valve for controlling the supply of water to the tank A. This valve E, is preferably made flat as shown, and it is provided upon its upper side with a disk *d*, of leather or equivalent material which is designed to seat against the under side of the spout D, and close the aperture *b*. The valve E, is also provided as better shown in Fig. 3, with two apertures *e*, which are disposed on opposite sides of the washer *d*, and are designed to receive the guide shank *f*. This guide shank *f*, is, for the sake of cheapness, formed from a single piece of wire or similar material, which is bent into loop form and has its legs *g*, passed through the apertures *e*, of the valve as shown. These legs *g*, of the guide shank, are designed and adapted to rest and move in the grooves *c*, of the spout so as to guide the valve E, in its movements, and they are brought together at about the proportional distance illustrated above the valve so as to form a stem *h*, to receive the float F. The float F, may be formed from wood or other buoyant material and it is adjustably fixed upon the stem *h*, by the thumb screw *i*, which takes through a suitable collar *j*, as illustrated. By this construction it will be perceived that the normal depth of the water in the tank A, may be readily regulated; it being simply necessary to move the collar *j*, toward the upper end of the guide shank when it is desired to increase the normal depth and toward the valve when it is desired to decrease the depth.

In the practice of my invention it will be seen that as the water from the spout D, rises in the tank A, the float F, will rise with the water until the valve E, is carried against the under side of the spout and cuts off the supply; and it will also be seen that when a portion of the water is removed from the tank, the float will fall and will move the valve away from the spout so as to permit a quantity of water corresponding to the quantity removed, to flow into the tank when the float rising will carry the valve against the spout and close the aperture *b*, thereof.

It will be readily perceived from the foregoing description taken in connection with the drawings that my improved apparatus is very simple, and compact, and by reason of the arrangement described it will be seen that a number of animals may drink at the tank without crowding or in any way interfering with each other.

The valve disclosed for controlling the supply of water to the tank, is very simple and inexpensive, and it is positive and sure in its action, and it is convenient of access and may be readily removed and repaired when worn or broken without the employment of skilled labor, which is a desideratum.

Having described my invention, what I claim is—

1. In an apparatus for watering stock, the combination with a tank, and a spout leading from a source of supply and arranged in the tank and having a discharge aperture in its under side and also having the ways or grooves $c$, in its vertical sides; of the valve E, the guide shank $f$, formed from a single piece of wire bent into loop form and having legs as $g$, passed through apertures in the valve and resting in the ways or grooves $c$, of the spout and having their free portions brought together to form a stem as $h$, and the float mounted on the stem portion of the guide shank, substantially as specified.

2. In an apparatus for watering stock, the combination with a spout having a discharge aperture in its under side and also having the ways or grooves $c$, in its vertical sides; of the valve E, the guide shank $f$, formed from a single piece of wire bent into loop form and having legs as $g$, passed through apertures in the valve and resting in the ways or grooves $c$, of the spout and having their free portions brought together to form a stem as $h$, the float loosely mounted on the stem portion of the guide shank, the collar loosely mounted on the stem portion above the float, and a screw taking through the collar and adapted to engage the shank so as to adjustably fix the collar, substantially as specified.

3. In an apparatus for watering stock, the combination with a spout having a discharge aperture in its under side and also having the ways or grooves $c$, in the outer sides of its vertical side walls; of the valve E, arranged exterior to and beneath the spout and adapted to bear against the under side thereof, guides connected to the valve and resting in the ways or grooves $c$, of the spout, a float, and a suitable means for connecting the guides and the float, substantially as and for the purpose set forth.

In testimony whereof I affix my signature in presence of two witnesses.

JOHN EDWARD KORDICK.

Witnesses:
S. J. McFARLAND,
K. R. MADDEN.